US009705551B2

(12) United States Patent
Gaines et al.

(10) Patent No.: US 9,705,551 B2
(45) Date of Patent: Jul. 11, 2017

(54) STABLE COMMUNICATION COVER

(71) Applicants: Jason Gaines, Vancouver, WA (US);
Amber Gaines, Vancouver, WA (US)

(72) Inventors: Jason Gaines, Vancouver, WA (US);
Amber Gaines, Vancouver, WA (US)

(*) Notice: Subject to any disclaimer, the term of this patent is extended or adjusted under 35 U.S.C. 154(b) by 82 days.

(21) Appl. No.: 14/678,975

(22) Filed: Apr. 4, 2015

(65) Prior Publication Data
US 2015/0288408 A1  Oct. 8, 2015

Related U.S. Application Data

(60) Provisional application No. 61/975,092, filed on Apr. 4, 2014.

(51) Int. Cl.
*H01H 27/06* (2006.01)
*H04B 1/3888* (2015.01)
*H04M 1/667* (2006.01)

(52) U.S. Cl.
CPC .......... *H04B 1/3888* (2013.01); *H04M 1/667* (2013.01)

(58) Field of Classification Search
CPC ....... H01H 2009/02; H01H 2009/0285; H01H 2009/06; H01H 2223/00; H01H 2223/003; H01H 2223/01; H01H 2223/026; H01H 2223/028; H01H 2223/034; H01H 2223/04; H01H 2223/044; H01H 2231/01; H01H 2231/036; H01H 2231/048; H01H 2231/052

USPC .... 200/43.18, 293, 293.1, 302.1–302.3, 303, 200/345, 43.01, 43.11, 43.17, 43.22; 174/50, 50.51, 50.54, 520, 521, 522, 174/FOR. 109
See application file for complete search history.

(56) References Cited

U.S. PATENT DOCUMENTS

| | | | | |
|---|---|---|---|---|
| 3,898,397 A | * | 8/1975 | Devore | G05G 9/04785 200/302.3 |
| 4,081,630 A | * | 3/1978 | Washburn | H04M 1/667 379/445 |
| 4,317,262 A | * | 3/1982 | Wells, Jr. | F16L 3/12 24/16 PB |
| 4,823,397 A | * | 4/1989 | Hewitt | H04B 1/3833 200/302.3 |
| 5,380,968 A | | 1/1995 | Morse | |
| 7,069,063 B2 | * | 6/2006 | Halkosaari | H04M 1/18 200/302.1 |
| 7,519,404 B2 | | 4/2009 | Lonka et al. | |

(Continued)

FOREIGN PATENT DOCUMENTS

WO  WO2014130862 A1  8/2014

*Primary Examiner* — Edwin A. Leon
*Assistant Examiner* — Anthony R. Jimenez
(74) *Attorney, Agent, or Firm* — D'Hue Law LLC; Cedric A. D'Hue; Alexander Harvey

(57) ABSTRACT

Embodiments of the Stable Communication Cover include a protective cover comprised of a protrusion for use with externally located and externally operated switch or switches on a mobile electronic device, such as a Walkie Talkie. Other embodiments of the Stable Communication Cover include a protective guard for use with externally located and externally operated switch or switches on a mobile electronic device. The protective cover provides protection from unintentional switch manipulations and environmental elements. The protective guard provides protection from unintentional manipulations.

17 Claims, 4 Drawing Sheets

(56) References Cited

U.S. PATENT DOCUMENTS

2008/0053802 A1     3/2008   Rae et al.
2008/0204981 A1     8/2008   Rae et al.
2011/0312289 A1*   12/2011   Garcia ................ H01H 13/023
                                                       455/90.1

\* cited by examiner

STABLE COMMUNICATION COVER

CROSS REFERENCE TO RELATED APPLICATIONS

This application claims the benefit of U.S. Provisional Patent Application No. 61/975,092, filed Apr. 4, 2014, the content of which is expressly incorporated by reference.

FIELD

This disclosure pertains to the fields of communication and safety, in particular, walkie-talkies.

BACKGROUND

Environmental elements and unintentional switch manipulations could potentially cause positional changes to external switch settings on electronic devices. Traditionally, the methods for protecting switches have included hard cases requiring removal of the electronic device for usage and switch manipulations. However, this method hinders prompt usage which is commonly necessary by governmental workers like the police and fire fighters. These methods gave rise to more sophisticated protective covers that utilize different materials like polymers to form and to house the electronic switches. These more sophisticated protecting covers also include transparent portions to allow viewing switch settings and supple enough to allow manipulation of the switch through the cover.

However, since these more sophisticated protecting covers engage switches of mobile device and translate external manipulation to switches, these more sophisticated protecting covers are susceptible to unintentional switch manipulation. Therefore these more sophisticated protecting covers do not protect against unintentional switch manipulations.

Many examples of seals for electrical switches may be found in the prior art. For example, International Publication Number WO 2014/130862 (the '862 Publication), titled Protective case with switch cover, teaches protective covers for mechanical switches. More particularly, it relates to protective cases for mobile electronic devices having switch covers configured to actuate mechanical switches on the mobile electronic devices. It is focused on mobile devices which incorporate switches or toggles, which mechanically move (i.e., translate) from a first position to a second position. Furthermore, it provides a switch cover that can adjust position to fit over the mobile device switch, move in the same direction (i.e., translate) as the mobile device switch and externally indicate the position of the covered mobile device switch.

However in the '862 Publication, the switch cover engages switch of mobile device and translates to match the underlying switch. Therefore the switch cover of the '862 Publication does not protect against unintentional switch manipulations.

In U.S. Published Patent Application Number 2008/0053802 and U.S. Published Patent Application Number 2008/0204981 (the '802 application and the '981 application respectively), each titled, Enclosure for Electronic Device, each document illustrates an enclosure for portable electronic devices, for example an MP3 player. Each includes a case and a caseplate where the caseplate defines the access opening. The liner is mounted to the caseplate where the liner is, among other things, sufficiently thin so that a tactile region is formed at the location of switch to permit switch to be manipulated by touching the tactile region such as by pressing inwardly against switch.

However, in the '802 application & the '981 application, the liner is sufficiently thin to permit switch to be manipulated through liner. An unintentional switch manipulation through liner may translate to the switch. Therefore while the liner covers the switch, the liner doesn't protect against unintentional switch manipulations.

U.S. Pat. No. 5,380,968 (the '968 Patent), titled Protective Cover for Switches, illustrates an elastomeric protective cover for use in housing an electrical switch. The cover includes a trigger mechanism or engagement. When pressure is applied to any region near the engaging means, the housing will be deformed, forcing the engaging means to contact switch and engages the switch.

However, the '968 Patent housing is elastomeric and is malleable to permit switch to be manipulated through housing. Therefore unintentional switch manipulation through housing may manipulate switch. Therefore while housing covers the switch, housing doesn't protect against unintentional switch manipulations.

Furthermore, the '968 Patent engaging means of the housing are configured to conform to different kinds of switches. Therefore housing is not a universal protection cover for knobs of any model of mobile electronic devices from environmental elements.

In the cellular phone arena, methods for protecting buttons have included flaps to allow relatively easy access to the device all-the-while providing the necessary protection from the environment and bumping. However, these flaps are typically hinge based structures specific to a particular mobile device, not a universal cover for use with any model of mobile electronic devices and these flaps leave the covered switches are susceptible to environmental elements like water and dust.

Mobile electronic switch covers should be designed to fit over just the protruding switches of mobile electronic devices. Mobile electronic switch covers should provide protection to the switches from both environmental elements like water and dust as well as unintentional switch manipulations, commonly called "bumping the switch" or just "bumping". It would be desirable and beneficial if some form of protective cover could be provided over the switch or switches of a Walkie Talkie without unintentional switch manipulations.

SUMMARY OF THE INVENTION

A first embodiment of the Stable Communication Cover is a protective cover comprised of a horizontal portion with a protrusion for use with externally located and externally operated switch or switches on a mobile electronic device, such as a Walkie Talkie. The protective cover is comprised of a vertical portion configured to be placed against one wall of mobile electronic device. Stable Communication Cover is a protective cover for the use with mobile electronic devices that have a switch that is configured to move between a first switch position and a second switch position. The protective cover can be configured to provide a multiplicity of mechanical properties or structures and can be configured to use mechanical properties of materials. The protective cover which can be configured using a multiplicity of mechanical properties provides protection from unintentional switch manipulations and environmental elements.

A second embodiment of the Stable Communication Cover is a protective guard for use with externally located and externally operated switch or switches on a mobile electronic device, such as a Walkie Talkie. The Stable Communication Cover is a protective guard for the use with mobile electronic devices that have a switch that is configured to move between a first switch position and a second switch position. The Stable Communication Cover is a protective guard which can be configured to provide a multiplicity of mechanical properties or structures and can be configured to use mechanical properties of materials. The protective guard can be configured using a multiplicity of mechanical properties providing protection from unintentional switch manipulations and environmental elements, such as to absorb an impingement or to deflect an impingement.

The foregoing and other features and advantages of one or more various embodiments of the present disclosure will become further apparent from the following detailed description of the embodiments, read in conjunction with the accompanying drawings. The description and drawings are merely illustrative of one or more various embodiments of the disclosure, rather than limiting the scope of the invention.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
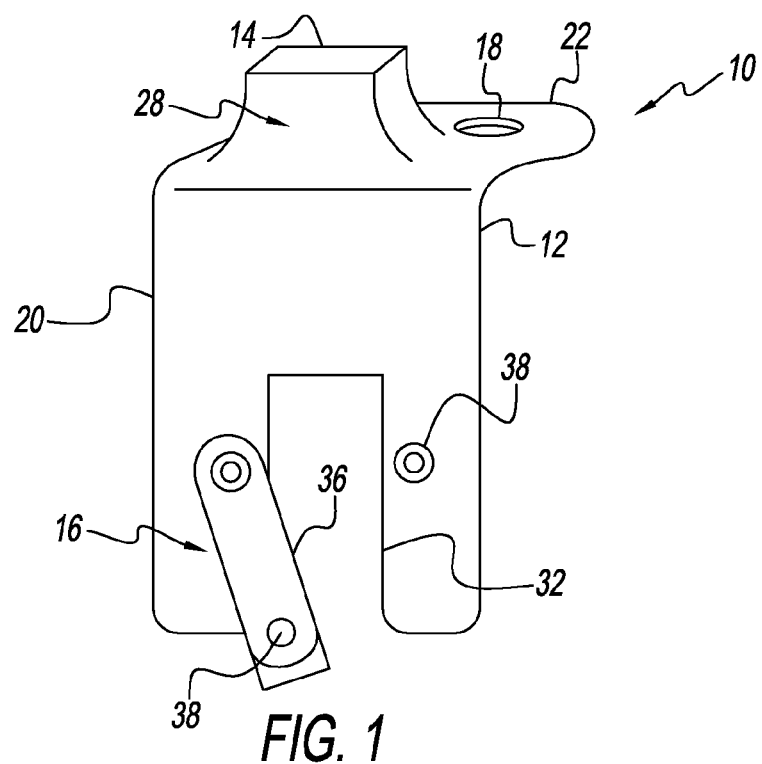
FIG. 1 displays a perspective view of the first embodiment of a cover according to an embodiment of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Stable Communication Cover (SCC) is a cover for external switches on mobile devices, such as Walkie Talkies, to prevent unplanned or unwanted switch manipulation. Inadvertent or unintended switch manipulation may lead to unplanned or unwanted changes in channel and/or volume. All inadvertent, unplanned, unwanted, or unintended changes in switch settings are commonly referred to as unintended switch manipulations. SCC may benefit a user while being worn on or about one's person to maximize communication and safety. SCC embodiments may provide combined protection from unintended switch manipulations and from environmental elements or alternative SCC embodiments may provide protection from unintended switch manipulations.

Figure 3:
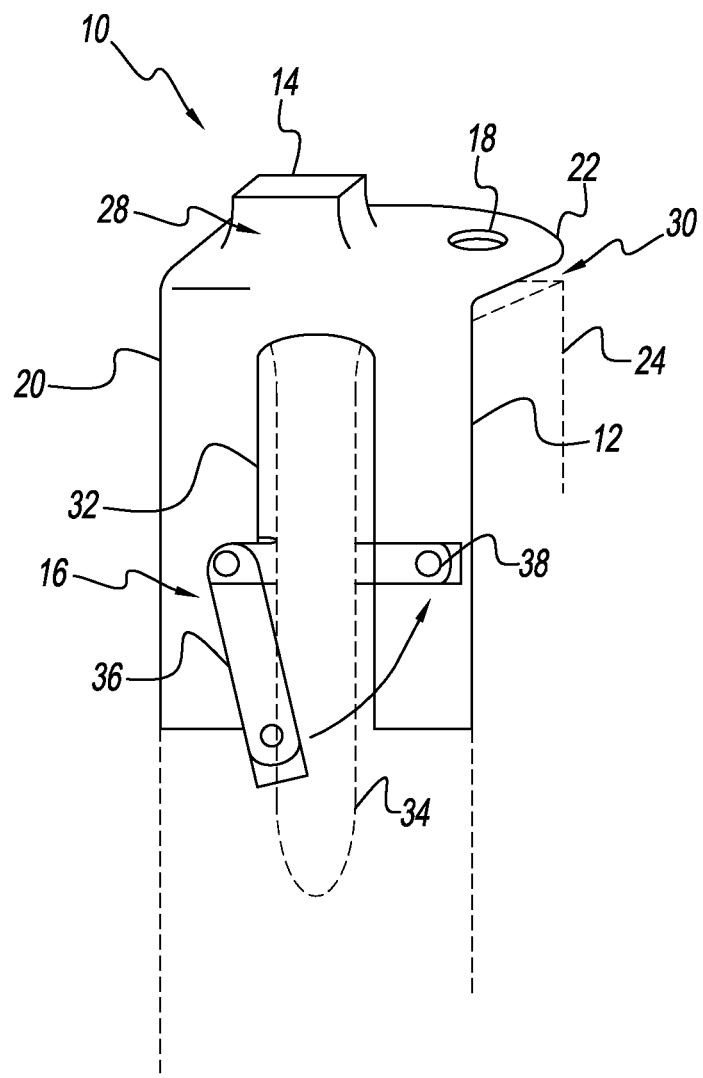
FIG. 3 displays a perspective view of the first embodiment of the cover of FIG. 1 coupling to a Walkie Talkie.
Figure 4:
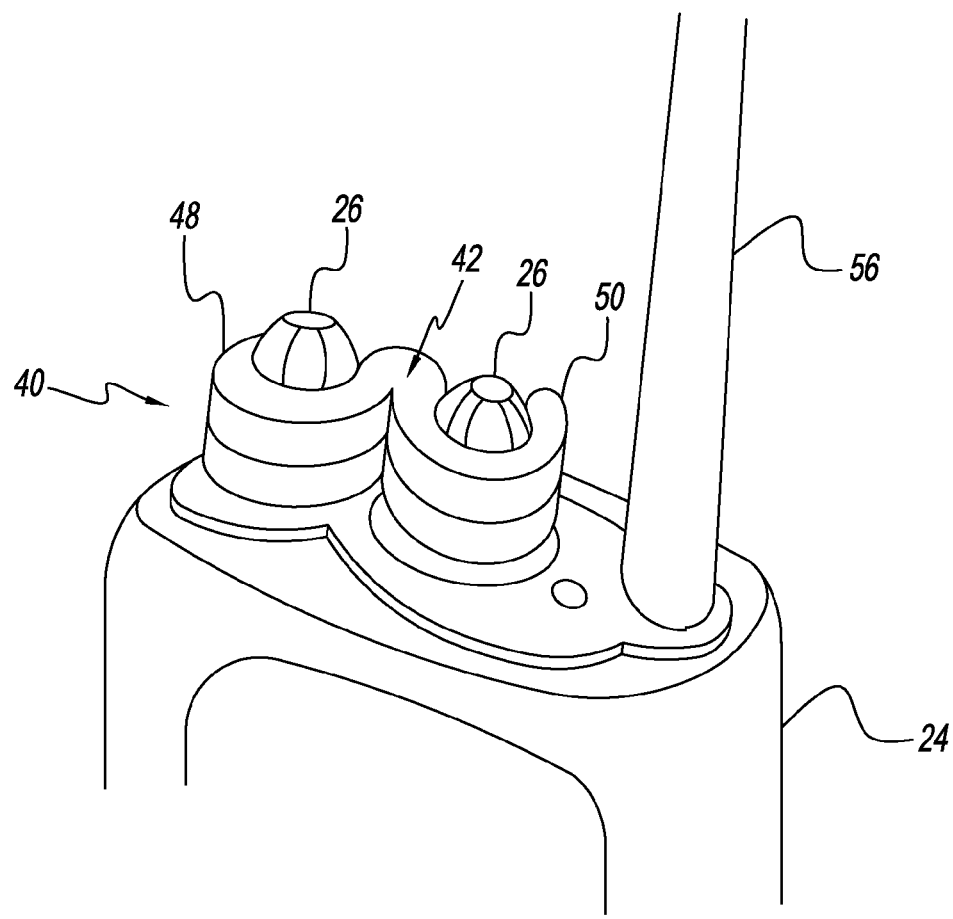
FIG. 4 displays a perspective view of the second embodiment of a guard with portions of a Walkie Talkie according to an embodiment of the present disclosure.

Referring to FIG. 1, there is shown one preferred embodiment of a protective cover 10 for a mobile device, such as Walkie Talkie 24, according to the present disclosure. Cover 10 includes body 12, protrusion 14 and latch mechanism 16. Body 12 may define at least one aperture 18. It is envisioned that cover 10 is molded of a durable rubber or plastic. As best illustrated in FIG. 3, body 12 is comprised of vertical portion 20 and horizontal portion 22 relative to an upright Walkie Talkie 24. In this illustration, vertical portion 20 and horizontal portion 22 are configured to tightly engage perpendicular walls of Walkie Talkie 24.

Figure 2:
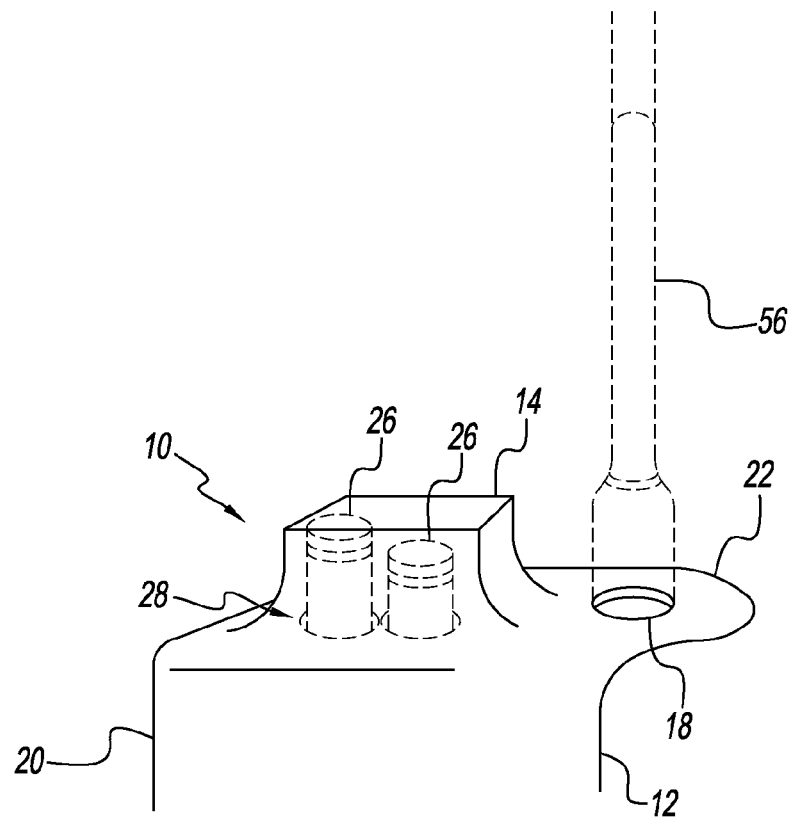
FIG. 2 displays a perspective view of the first embodiment of the cover of FIG. 1 with portions of a Walkie Talkie according to an embodiment of the present disclosure.

Referring to FIG. 2 as in this illustration Walkie Talkie switches 26 are on the top side of an upright Walkie Talkie 24, body 12 defines protrusion 14 to correspond to the location of switches 26 by locating protrusion on horizontal portion 22.

Protrusion 14 defines enclosure 28. Enclosure 28 is configured to surround switches 26. Protrusion 14 may be made of materials that provide firmness or structural rigidity. The firmness or structural rigidity will be provided by a region with different mechanical properties. Such structural rigidity may be provided by the combination of geometric shapes of the protective cover's protrusion dimensional features. Also such structural rigidity may be provided by different material used with different compression strength. This differential in mechanical properties, whether by a combination of geometric shapes and/or by use of different materials, may provide protection from unintended switch manipulations.

Protective cover 10 is adapted for the use with Walkie Talkie 24, as illustrated in FIG. 2, or any other similar type of mobile electronic device with externally located and externally manipulated switch 26 as part of mobile electronic device wall. As shown therein, protective cover 10 outwardly extends from horizontal portion 22 to define protrusion 14 for receiving a mobile electronic device, such as Walkie Talkie 24.

As illustrated in FIG. 3, the protective cover 10 is then placed over the top of the externally located and externally manipulated switches under protrusion 14 and contacting the top oriented surface of Walkie Talkie 24 providing seal 30. This seal provides the protection from environmental elements.

The protective cover 10 may be made of clear or transparent material for visual confirmation of switch setting.

Horizontal portion 22 may fully cover the top oriented surface of the Walkie Talkie 24 and will make contact with top oriented surface providing seal 30.

In FIG. 3, vertical portion 20 extends perpendicularly away from the horizontal portion 22 in a downward direction. This embodiment has vertically oriented slot 32 extending to the bottom edge of vertical portion 20. Vertically oriented slot 32 provides the ability to receive mounting bracket 34 of Walkie Talkie 24. Vertically oriented slot 32 could receive a holster (not shown) holding the Walkie Talkie 24. Vertically oriented slot 32 adds utility by allowing Walkie Talkie 24 to be secured relatively quickly to Walkie Talkie 24 or Walkie Talkie mounting bracket 34.

This embodiment has vertically oriented slot 32 extending to the bottom edge of vertical portion 20. Vertical portion 20 includes latch mechanism 16 including strap 36.

A method to secure cover 10 to a stable mounting position is presented as a strap 36 securely affixed to vertical portion 20. Strap 36 may be affixed or completely detachably mounted to vertical portion 20 with a multitude of fasteners 38 which may include, but not limited to, rivets, mechanical snaps, threaded bolts, and the like.

Figure 5:
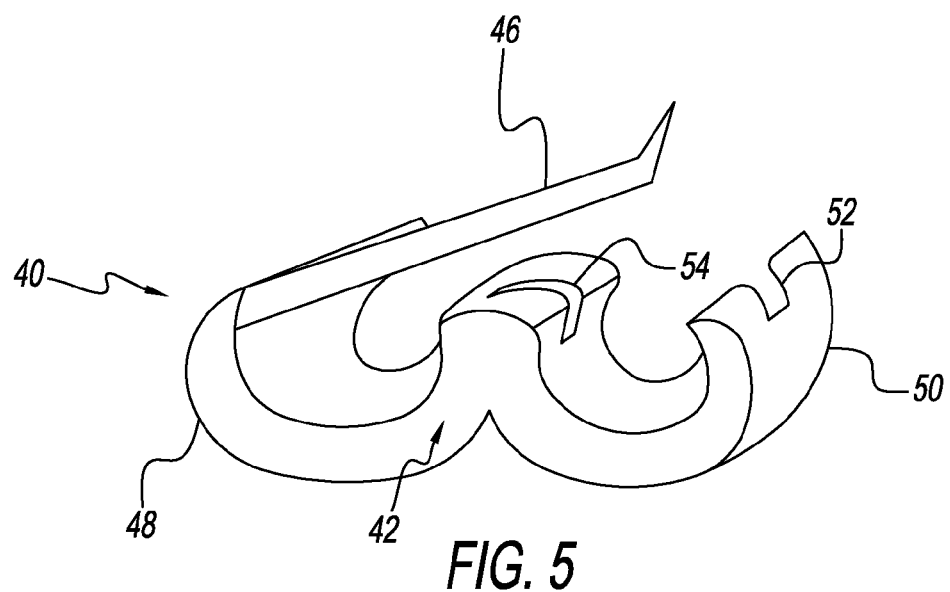
FIG. 5 displays a perspective view of another embodiment of the guard of FIG. 4 according to an embodiment of the present disclosure.
Figure 6:
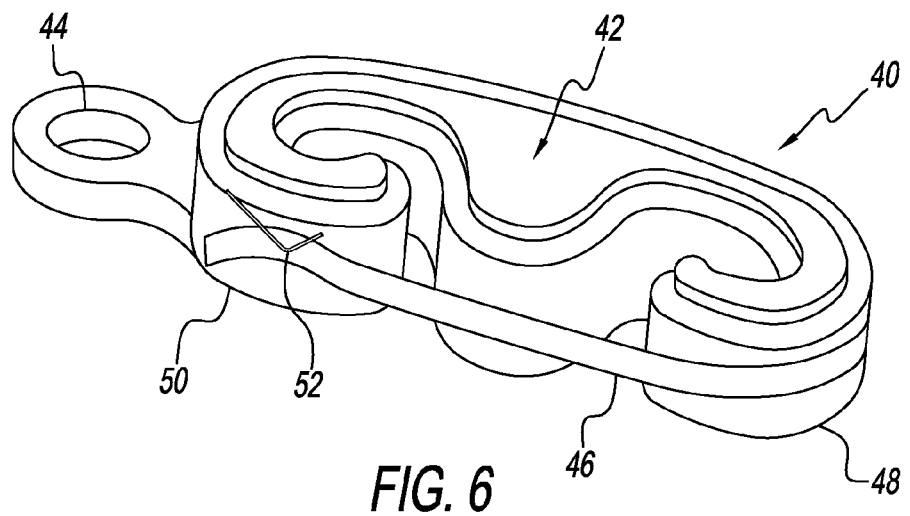
FIG. 6 displays a perspective view of yet another embodiment of the guard of FIG. 4 according to an embodiment of the present disclosure.

Referring to FIG. 5, there is shown a second preferred embodiment of protective guard 40 for Walkie Talkie 24 according to the present disclosure to provide protection from unintended switch manipulation. Protective guard 40 is adapted for the use with a Walkie Talkie 24, as illustrated in FIG. 6, or any other similar type of mobile electronic device with externally located and externally manipulated switch 26 while extending away from its case. It is envisioned that protective guard 40 is molded of a durable rubber and/or plastic.

In FIG. 6, protective guard 40 includes frame 42 defining antennae aperture 44 and latch 46. Frame 42 includes first arm 48 and second arm 50, commonly referred to as arms 48 and 50, configured to wrap around switches 26. Plurality of arms (not shown) is also envisioned. Arms 48 and 50 may be made of polymeric material or a rubber. At least one arm 48 or 50 includes latch 46. Second arm 50 defines holder 52 for latch 46. Frame 42 may define latch slot 54 configured to enclose at least a portion of latch 46 when latch 46 is bound to holder 52. It is envisioned that latch 46 to be made of any sufficiently sturdy material, such as metal wiring or an elastic material. The purpose of latch 46 is to transmit a force from one end of frame 42 or arm 48 or 50 to the other end of frame 42 or other arm 48 or 50. Transmission of the force places pressure between arms 48 and 50 and at least one switch 26 which induces friction. Friction keeps the at least one switch 26 from moving or rotating.

Antennae aperture 44 is located and positioned to correspond to antennae 56 of portable electronic device, such as Walkie Talkie 24. Antennae aperture 44 is intended to facilitate any antennae 56 location. It is envisioned that frame 42 is flexible enough to allow antennae aperture 44 to accommodate different locations of antennae 56.

As shown therein, protective guard 40 may be made of a polymeric material to provide flexibility to readily be able to place and to encompass any such externally located and externally manipulated switch 26 extending away from Walkie Talkie 24.

Referring to FIG. 6, protective guard 40 is combined with antennae aperture 44 as presented providing an ancillary function to maintain placement of protective guard 40.

Figure 7:
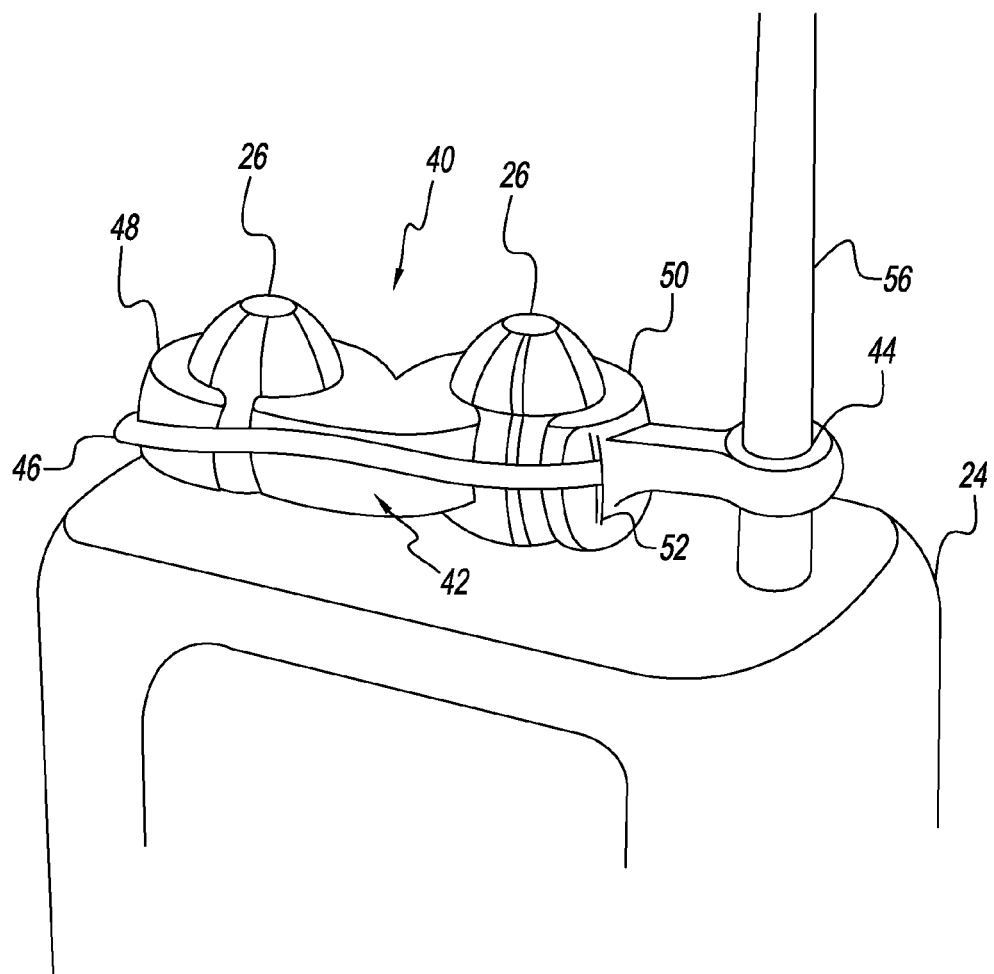
FIG. 7 displays a perspective view of still yet another embodiment of the guard of FIG. 4 with portions of a Walkie Talkie according to an embodiment of the present disclosure.

Referring to FIG. 7, protective guard 40 presents a rotational locking feature by way of applying measured linear stress on the outside surface of protective guard 40 to induce surface friction between rotating switch 26 and protective guard 40 to prevent unintended switch manipulations.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A protective cover comprising:
a body including a horizontal portion and a vertical portion,
the horizontal portion including a protrusion, the vertical portion integrally formed with the protrusion,
the protrusion defining an enclosure on the side of the horizontal portion adjacent to a portable electronic device, the protrusion located on the horizontal portion and corresponding to at least one externally located and externally manipulated switch of the portable electronic device, the protrusion sized and shaped to locate a substantial portion of the switch within the enclosure;
the vertical portion configured to extend substantially perpendicularly away from the horizontal portion, wherein the vertical portion and the horizontal portion in conjunction engage at least two perpendicular walls of the portable electronic device,
wherein the horizontal portion defines an antennae aperture, wherein the antennae aperture is located and positioned on the horizontal portion to correspond to an antennae of the portable electronic device, wherein the protrusion has structural rigidity to provide protection from switch manipulations to the at least one externally located and externally manipulated switch and wherein the body provides protection from environmental elements interacting with the at least one externally located and externally manipulated switch on the portable electronic device.

2. The protective cover of claim 1 wherein the protrusion is made of materials having a compressive strength to provide controllable structural rigidity in defined regions of the protective cover.

3. The protective cover of claim 1 wherein the protrusion is sized and shaped to be a greater size than the at least one switch.

4. The protective cover of claim 1 wherein the vertical portion defines a vertically oriented slot for receipt of the mounting bracket.

5. The protective cover of claim 1 wherein the protrusion is made of clear or transparent material to view switch settings on the portable electronic device.

6. The cover of claim 1 wherein there is sufficient structural rigidity to prevent a finger of a user from contacting the at least one externally located and externally manipulated switch.

7. The protective cover of claim 1 wherein the vertical portion includes a latch mechanism engaging a mounting bracket of the portable electronic device.

8. The protective cover of claim 7 wherein the latch mechanism includes a strap and a strap fastener.

9. The protective cover of claim 8 wherein the latch mechanism fastens the body to the portable electronic device under the mounting bracket.

10. The protective cover of claim 1 wherein the horizontal portion and the vertical portion substantially engage at least two perpendicular walls of the portable electronic device.

11. The protective cover of claim 10 wherein the horizontal portion and the vertical portion create a seal providing protection from environmental elements interacting with the at least one externally located and externally manipulated switch on the portable electronic device.

12. A protective cover comprising:
a frame including a first arm and a second arm,
the first arm wrapped around a first externally located and externally manipulated switch of a portable electronic device, the second arm wrapped around a second externally located and externally manipulated switch of the portable electronic device, the frame defines an antennae aperture, wherein the antennae aperture is integrally formed with the frame to correspond to an antennae of the portable electronic device, the first arm including a latch, the second arm including a latch holder, wherein the arms have structural rigidity to provide protection from switch manipulations to at least one of the first and second externally located and externally manipulated switches, wherein the frame and each of the first and second arms provide resistance from switch manipulations to at least one of said first and second externally located and externally manipulated switches via friction, wherein the frame is elastic and wherein a location of the antennae aperture is adjustable.

13. The protective over of claim 12 wherein the antennae is at least partially located in the antennae aperture.

14. The protective cover of claim 12 wherein the latch is elastic.

15. The protective cover of claim 12, wherein the frame defines a latch slot.

16. A method of providing protection from switch manipulations and environmental elements to at least one externally located and externally manipulated switch of a portable electronic device, the method comprising the steps of:

providing a cover including a protrusion, the protrusion located to correspond to the at least one externally located and externally manipulated switch of the portable electronic device, the protrusion sized and shaped to locate a substantial portion of the switch within the enclosure, wherein the protrusion has structural rigidity to provide protection from switch manipulations to the at least one externally located and externally manipulated switch, wherein the cover defines an antennae aperture;

sealing the cover against at least two perpendicular walls of the portable electronic device by substantially engaging the cover to the perpendicular walls, wherein the cover provides protection from environmental elements interacting with the at least one externally located and externally manipulated switch of the portable electronic device.

17. The method of claim 16 wherein the cover includes a latch mechanism.

* * * * *